(12) United States Patent
Briff et al.

(10) Patent No.: US 12,107,419 B2
(45) Date of Patent: Oct. 1, 2024

(54) SWITCHING VALVE

(71) Applicant: General Electric Technology GmbH, Baden (CH)

(72) Inventors: Pablo Briff, Stafford (GB); Carl Barker, Stafford (GB); Omar Jasim, Stafford (GB); Jose Augusto Monteiro, Stafford (GB)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 229 days.

(21) Appl. No.: 17/890,685

(22) Filed: Aug. 18, 2022

(65) Prior Publication Data

US 2023/0062409 A1 Mar. 2, 2023

(30) Foreign Application Priority Data

Aug. 27, 2021 (EP) ..................... 21275121

(51) Int. Cl.
*H02J 3/01* (2006.01)
*H02M 1/12* (2006.01)
*H02M 7/483* (2007.01)

(52) U.S. Cl.
CPC .............. *H02J 3/01* (2013.01); *H02M 1/12* (2013.01); *H02M 7/4835* (2021.05)

(58) Field of Classification Search
CPC ........... H02J 3/01; H02M 1/12; H02M 7/4835
See application file for complete search history.

(56) References Cited

U.S. PATENT DOCUMENTS

| | | |
|---|---|---|
| 2013/0033907 A1 | 2/2013 | Zhou et al. |
| 2018/0054144 A1* | 2/2018 | Mohanaveeramani . H02M 1/12 |
| 2018/0269775 A1 | 9/2018 | Sadilek et al. |
| 2020/0177096 A1* | 6/2020 | Ginnareddy ........ H02M 7/4835 |
| 2020/0350836 A1 | 11/2020 | Geske et al. |
| 2021/0021206 A1* | 1/2021 | Wang ...................... H02M 1/14 |
| 2023/0018083 A1* | 1/2023 | Kajiyama ........... H02M 7/5395 |

OTHER PUBLICATIONS

Extended European Search Report issued in EP Application No. 22175121.8, dated Feb. 14, 2022, 8 pages.

* cited by examiner

*Primary Examiner* — Fred E Finch, III
(74) *Attorney, Agent, or Firm* — Eversheds-Sutherland (US) LLP

(57) ABSTRACT

There is provided a switching valve for a voltage source converter, the switching valve including a number of modules, each module including at least one switching element and at least one energy storage device, the or each switching element and the or each energy storage device in each module arranged to be combinable to selectively provide a voltage source, the switching valve including a controller programmed to selectively control the switching of the switching elements to select one or more of the modules to contribute a or a respective voltage to a switching valve voltage.

15 Claims, 6 Drawing Sheets

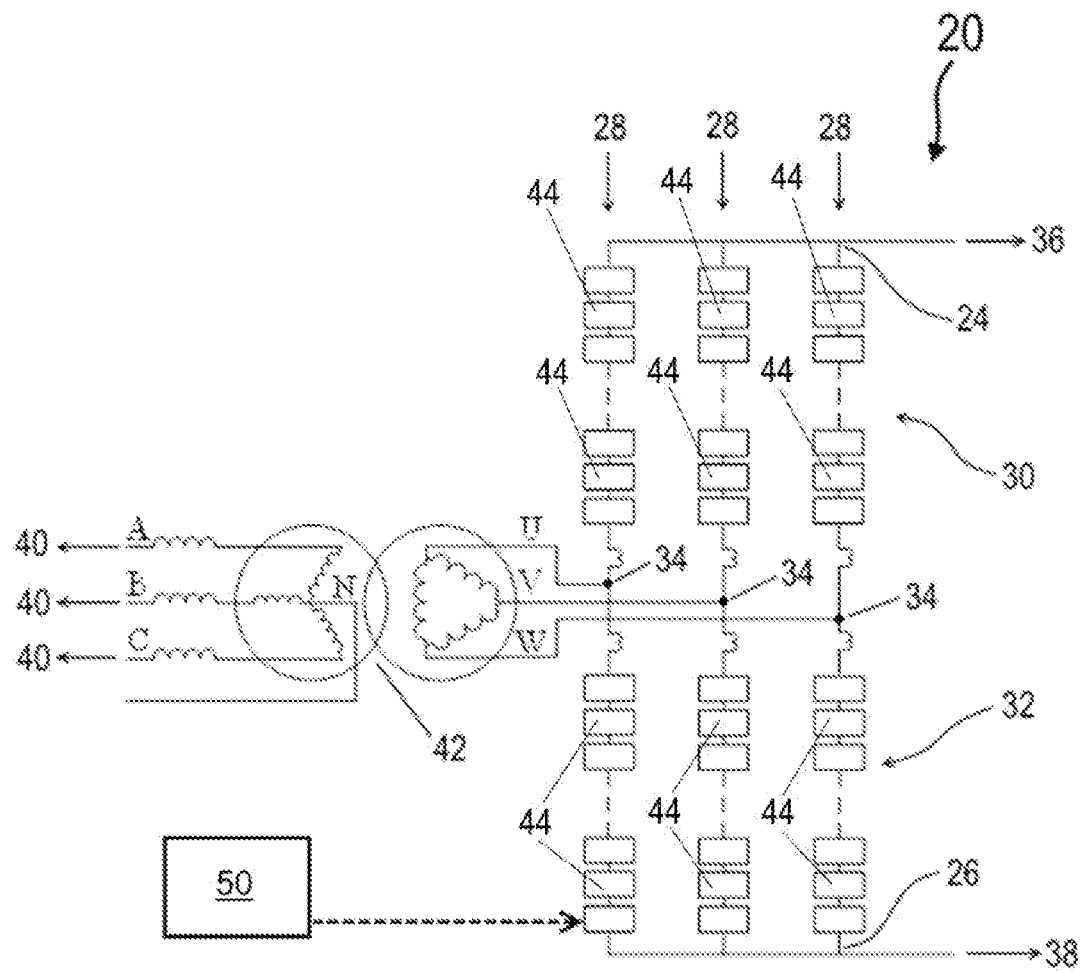
Figure 1
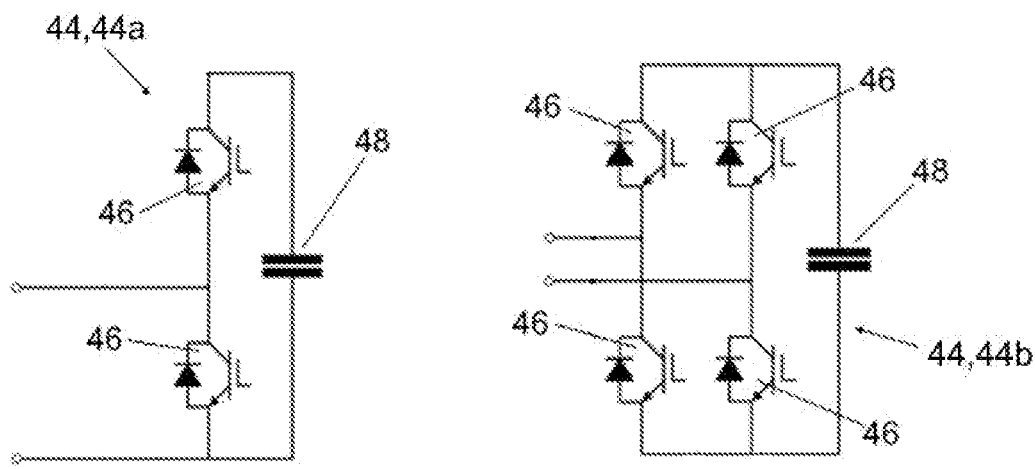
Figure 2  Figure 3

SWITCHING VALVE

TECHNICAL FIELD

This invention relates to a switching valve for a voltage source converter, a voltage source converter, a method of operating a switching valve for a voltage source converter and a method of operating a voltage source converter, preferably for use in high voltage direct current (HVDC) transmission and reactive power compensation.

BACKGROUND OF THE INVENTION

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power is also transmitted directly from offshore wind parks to onshore AC power transmission networks. The conversion between DC power and AC power is utilised where it is necessary to interconnect DC and AC networks. In any such power transmission network, converters (i.e. power converters) are required at each interface between AC and DC power to affect the required conversion from AC to DC or from DC to AC.

SUMMARY OF THE INVENTION

According to a first aspect of the invention, there is provided a switching valve for a voltage source converter, the switching valve comprising a plurality of modules, each module including at least one switching element and at least one energy storage device, the or each switching element and the or each energy storage device in each module arranged to be combinable to selectively provide a voltage source, the switching valve including a controller programmed to selectively control the switching of the switching elements to select one or more of the modules to contribute a or a respective voltage to a switching valve voltage, wherein the controller is programmed to:
designate a reserved energy stored in the switching valve for use by the switching valve to perform a harmonic modification operation;
obtain a harmonic frequency spectrum of a harmonic content of or associated with the voltage source converter;
obtain a harmonic energy from the harmonic frequency spectrum;
configure one or more of coefficients of a harmonic modification transfer function of the switching valve at one or more harmonic orders responsive to the obtained harmonic energy;
validate the or each configured coefficient if a condition of a resultant energy required for the harmonic modification operation being equal to or lower than the reserved energy stored in the switching valve is fulfilled;
control the switching of the switching elements to configure a magnitude and/or a phase of the switching valve voltage so that the switching valve is operated to perform the harmonic modification operation in accordance with the or each validated configured coefficient to modify at least one harmonic component of the harmonic content of or associated with the voltage source converter.

In a preferred embodiment of the invention, the controller may be programmed to:
designate a reserved energy stored in the switching valve for use by the switching valve to perform a harmonic damping operation;
obtain a harmonic frequency spectrum of a harmonic content of or associated with the voltage source converter;
obtain a harmonic energy from the harmonic frequency spectrum;
configure one or more of damping coefficients of a harmonic damping transfer function of the switching valve at one or more harmonic orders responsive to the obtained harmonic energy;
validate the or each configured damping coefficient if a condition of a resultant damping energy required for the harmonic damping operation being equal to or lower than the reserved energy stored in the switching valve is fulfilled;
control the switching of the switching elements to configure a magnitude and/or a phase of the switching valve voltage so that the switching valve is operated to perform the harmonic damping operation in accordance with the or each validated configured damping coefficient to attenuate at least one harmonic component of the harmonic content of or associated with the voltage source converter.

In another preferred embodiment of the invention, the controller may be programmed to:
designate a reserved energy stored in the switching valve for use by the switching valve to perform a harmonic amplification operation;
obtain a harmonic frequency spectrum of a harmonic content of or associated with the voltage source converter;
obtain a harmonic energy from the harmonic frequency spectrum;
configure one or more of amplification coefficients of a harmonic amplification transfer function of the switching valve at one or more harmonic orders responsive to the obtained harmonic energy;
validate the or each configured amplification coefficient if a condition of a resultant amplification energy required for the harmonic amplification operation being equal to or lower than the reserved energy stored in the switching valve is fulfilled;
control the switching of the switching elements to configure a magnitude and/or a phase of the switching valve voltage so that the switching valve is operated to perform the harmonic amplification operation in accordance with the or each validated configured amplification coefficient to amplify at least one harmonic component of the harmonic content of or associated with the voltage source converter.

In yet another preferred embodiment of the invention, the harmonic modification operation may involve a combination of harmonic amplification and harmonic damping so as to amplify at least one harmonic component and attenuate at least one other harmonic component of the harmonic content of or associated with the voltage source converter.

The configuration of the controller provides the switching valve of the invention with an adaptive active modification capability for reducing harmonic stress of equipment in or associated with the voltage source converter while the voltage source converter is in operation. The online nature of the adaptive active modification capability enables optimal usage of the reserved energy designated for harmonic modification in a wide range of harmonic modification conditions. This in turn obviates the need to increase the amount of reserved energy designated for harmonic modification, thus providing size, weight and cost savings. In contrast, whilst the harmonic modification transfer function can be designed by way of offline simulations, such a harmonic modification transfer function is static in nature and thereby cannot be adapted to different harmonic modification conditions to optimise the usage of the reserved energy designated for harmonic modification. In the event of the condition of a resultant energy required for the harmonic modification operation being equal to or lower than the reserved energy stored in the switching valve not being fulfilled, the or each configured modification coefficient is not validated by the controller for use in the harmonic modification operation.

In embodiments of the invention, the controller may be programmed to iteratively configure one or more of coefficients of a harmonic modification transfer function of the switching valve at one or more harmonic orders responsive to the obtained harmonic energy until the or each configured coefficient is validated. This enables the controller to repeat the process of configuring one or more of the coefficients of the harmonic modification transfer function to ensure that the harmonic modification operation in accordance with the or each validated configured coefficient can be performed.

The configuration of one or more of the coefficients of a harmonic modification transfer function of the switching valve at one or more harmonic orders responsive to the obtained harmonic energy can be carried out in a variety of ways. For example, the controller may be programmed to configure one or more of coefficients of a harmonic modification transfer function of the switching valve at one or more harmonic orders responsive to the obtained harmonic energy with reference to a lookup table, wherein the lookup table is configured to store a plurality of combinations of coefficients of the harmonic modification transfer function. Alternatively or additionally, a real-time solver may be programmed to calculate the coefficients of the harmonic modification transfer function of the switching valve responsive to the obtained harmonic energy so as to enable the controller to then configure one or more of coefficients of the harmonic modification transfer function of the switching valve at one or more harmonic orders. The calculation by the real-time solver may be carried out subject to a condition of a resultant energy required for the harmonic modification operation being equal to or lower than the reserved energy stored in the switching valve. In one example, the controller may include a real-time solver. In another example, the controller may be configured for communication with an external real-time solver, wherein the controller may be programmed to selectively transmit information (e.g. the obtained harmonic energy) to the external real-time solver and receive calculated damping coefficients from the external real-time solver.

The validation of the or each configured coefficient may be subjected to one or more additional conditions to facilitate a more reliable performance of the switching valve. In one example, the controller may be programmed to validate the or each configured coefficient if an additional condition of a harmonic impedance of the voltage source converter having a positive resistive component is fulfilled. The controller may be programmed to evaluate a phase margin of the harmonic impedance of the voltage source converter to assess whether the additional condition of a harmonic impedance of the voltage source converter having a positive resistive component is fulfilled.

In further embodiments of the invention, the controller may include a frequency mask configured to mask one or more harmonics of the obtained harmonic frequency spectrum, and the controller may be programmed to obtain the harmonic energy from the or each unmasked harmonic of the harmonic frequency spectrum. The selection of some of the harmonic content (i.e. harmonic orders) using the frequency mask may be required to satisfy application requirements, e.g. customer specifications, that specify which harmonic content can/must be damped/eliminated and which harmonic content can/must be left unmodified.

In embodiments of the invention, the controller may be programmed to selectively control the switching of the switching elements to select one or more of the modules to contribute a or a respective voltage to the switching valve voltage in order to modify an average or median energy storage device voltage of the switching valve as a function of the obtained harmonic energy. This enables regulation of the reserved energy stored in each switching valve to meet the energy requirements of the harmonic damping operation.

In the switching valve of the invention, the one or more harmonic orders may include at least one sub-synchronous harmonic order and/or at least one super-synchronous harmonic order.

According to a second aspect of the invention, there is provided a voltage source converter comprising a switching valve according to any one of the first aspect of the invention and its embodiments. The features and advantages of the switching valve of the first aspect of the invention and its embodiments apply mutatis mutandis to the features and advantages of the voltage source converter of the second aspect of the invention and its embodiments. The voltage source converter may comprise a plurality of switching valves, each of which is configured in accordance with any one of the first aspect of the invention and its embodiments.

According to a third aspect of the invention, there is provided a method of operating a switching valve for a voltage source converter, the switching valve comprising a plurality of modules, each module including at least one switching element and at least one energy storage device, the or each switching element and the or each energy storage device in each module arranged to be combinable to selectively provide a voltage source, the switching elements being switchable to select one or more of the modules to contribute a or a respective voltage to a switching valve voltage, wherein the method comprises the steps of:

designating a reserved energy stored in the switching valve for use by the switching valve to perform a harmonic modification operation;

obtaining a harmonic frequency spectrum of a harmonic content of or associated with the voltage source converter;

obtaining a harmonic energy from the harmonic frequency spectrum;

configuring one or more of coefficients of a harmonic modification transfer function of the switching valve at one or more harmonic orders responsive to the obtained harmonic energy;

validating the or each configured coefficient if a condition of a resultant energy required for the harmonic modification operation being equal to or lower than the reserved energy stored in the switching valve is fulfilled;

controlling the switching of the switching elements to configure a magnitude and/or a phase of the switching valve voltage so that the switching valve is operated to perform the harmonic modification operation in accordance with the or each validated configured coefficient to modify at least one harmonic component of the harmonic content of or associated with the voltage source converter.

The features and advantages of the switching valve of the first aspect of the invention and its embodiments apply mutatis mutandis to the features and advantages of the method of the third aspect of the invention and its embodiments.

According to a fourth aspect of the invention, there is provided a method of operating a voltage source converter comprising a switching valve, the switching valve comprising a plurality of modules, each module including at least one switching element and at least one energy storage device, the or each switching element and the or each energy storage device in each module arranged to be combinable to selectively provide a voltage source, the switching elements being switchable to select one or more of the modules to contribute a or a respective voltage to a switching valve voltage, the method comprising the step of operating a switching valve in accordance with any one of the third aspect of the invention and its embodiments. The features and advantages of the first, second and third aspects of the invention and their embodiments apply mutatis mutandis to the features and advantages of the method of the fourth aspect of the invention and its embodiments.

Each module in the switching valve of the invention may vary in configuration, non-limiting examples of which are set out as follows.

In a first exemplary configuration of a module, the or each switching element and the or each energy storage device in the module may be arranged to be combinable to selectively provide a unidirectional voltage source. For example, the module may include a pair of switching elements connected in parallel with an energy storage device in a half-bridge arrangement to define a 2-quadrant unipolar module that can provide zero or positive voltage and can conduct current in two directions. In a second exemplary configuration of a module, the or each switching element and the or each energy storage device in the module may be arranged to be combinable to selectively provide a bidirectional voltage source. For example, the module may include two pairs of switching elements connected in parallel with an energy storage device in a full-bridge arrangement to define a 4-quadrant bipolar module that can provide negative, zero or positive voltage and can conduct current in two directions.

The plurality of modules may be connected in series to define a chain-link converter. The structure of the chain-link converter permits build-up of a combined voltage across the chain-link converter, which is higher than the voltage available from each of its individual modules, via the insertion of the energy storage devices of multiple modules, each providing its own voltage, into the chain-link converter. In this manner switching of the or each switching element in each module causes the chain-link converter to provide a stepped variable voltage source, which permits the generation of a voltage waveform across the chain-link converter using a step-wise approximation. Hence the chain-link converter is capable of providing a wide range of complex voltage waveforms.

At least one switching element may be a wide-bandgap material based switching element or a silicon semiconductor based switching element. Examples of wide-bandgap materials include, but are not limited to, silicon carbide, boron nitride, gallium nitride and aluminium nitride. At least one switching element may include at least one self-commutated switching device. The or each self-commutated switching device may be an insulated gate bipolar transistor (IGBT), a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. The number of switching devices in each switching element may vary depending on the required voltage and current ratings of that switching element. At least one switching element may further include a passive current check element that is connected in anti-parallel with the or each switching device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy to selectively provide a voltage, e.g. a capacitor, fuel cell or battery.

The configuration of the voltage source converter may vary depending on its operating requirements. In embodiments of the invention, the voltage source converter may include at least one converter limb, the or each converter limb extending between first and second DC terminals, the or each converter limb including first and second limb portions separated by an AC terminal, each limb portion including a switching valve according to any one of the first aspect of the invention and its embodiments. In a preferred embodiment of the invention, the voltage source converter includes three converter limbs, each of which is connectable via the respective AC terminal to a respective phase of a three-phase AC network. It will be appreciated that the voltage source converter may include a different number of converter limbs, each of which is connectable via the respective AC terminal to a respective phase of an AC network with the corresponding number of phases.

BRIEF DESCRIPTION OF THE DRAWINGS

Preferred embodiments of the invention will now be described, by way of non-limiting examples, with reference to the accompanying drawings in which:

FIG. 1 shows a voltage source converter according to an embodiment of the invention;

FIG. 2 shows a schematic view of an exemplary half-bridge chain-link module;

FIG. 3 shows a schematic view of an exemplary full-bridge chain-link module;

Figure 4:
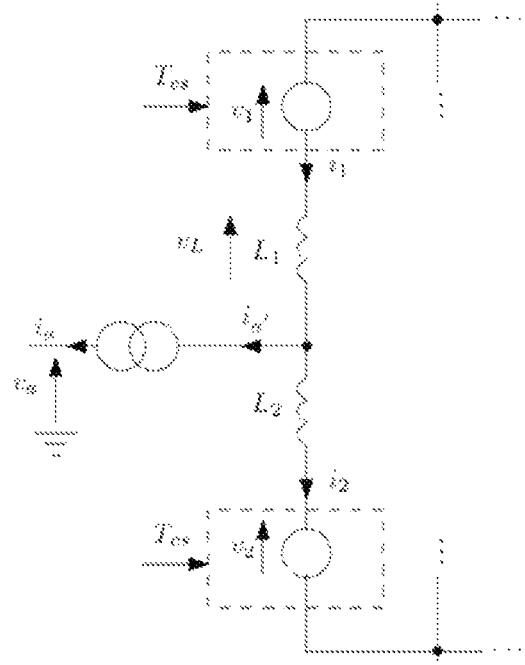
FIG. 4 shows a circuit representation of a converter limb of the voltage source converter of FIG. 1.

The figures are not necessarily to scale, and certain features and certain views of the figures may be shown exaggerated in scale or in schematic form in the interests of clarity and conciseness.

DETAILED DESCRIPTION

The following embodiments of the invention are used primarily in AC-DC voltage source conversion in HVDC applications, but it will be appreciated that the following embodiments of the invention are applicable mutatis mutandis to other types of voltage source converters and other applications operating at different voltage levels.

A voltage source converter according to an embodiment of the invention is shown in FIG. 1 and is designated generally by the reference numeral 20. The voltage source converter 20 includes first and second DC terminals 24,26 and a plurality of converter limbs 28. Each converter limb 28 extends between the first and second DC terminals 24,26 and includes first and second limb portions 30,32 separated by a respective AC terminal 34. In each converter limb 28, the first limb portion 30 extends between the first DC terminal 24 and the AC terminal 34, while the second limb portion 32 extends between the second DC terminal 26 and the AC terminal 34. In use, the first and second DC terminals 24,26 of the voltage source converter 20 are respectively connected to a DC network 36,38. In use, the AC terminal 34 of each converter limb 28 of the voltage source converter 20 is connected to a respective AC phase of a three-phase AC network 40 via a star-delta transformer arrangement 42. It is envisaged that in other embodiments of the invention the transformer arrangement 42 may be a star-star transformer arrangement, may be another type of transformer arrangement or may be omitted altogether. The three-phase AC network 40 is an AC power grid 40.

Each limb portion 30,32 includes a switching valve, which includes a chain-link converter that is defined by a plurality of series-connected modules 44. Each module 44 may vary in topology, examples of which are described as follows. FIG. 2 shows schematically the structure of an exemplary module 44 in the form of a half-bridge module 44*a*. The half-bridge module 44*a* includes a pair of switching elements 46 and a capacitor 48. Each switching element 46 of the half-bridge module 44*a* is in the form of an IGBT which is connected in parallel with an anti-parallel diode. The pair of switching elements 46 are connected in parallel with the capacitor 48 in a half-bridge arrangement to define a 2-quadrant unipolar module 44*a* that can provide zero or positive voltage and can conduct current in both directions. FIG. 3 shows schematically the structure of an exemplary module 44 in the form of a full-bridge module 44*b*. The full-bridge module 44*b* includes two pairs of switching elements 46 and a capacitor 48. Each switching element 46 of the full-bridge module 44*b* is in the form of an IGBT which is connected in parallel with an anti-parallel diode. The pairs of switching elements 46 are connected in parallel with the capacitor 48 in a full-bridge arrangement to define a 4-quadrant bipolar module 44*b* that can provide negative, zero or positive voltage and can conduct current in both directions.

The structure of a given module 44 includes the arrangement and type of switching elements 46 and energy storage device 48 used in the given module 44. It will be appreciated that it is not essential for all of the modules 44 to have the same module structure. For example, the plurality of modules 44 may comprise a combination of half-bridge modules 44*a* and full-bridge modules 44*b*.

It is envisaged that, in other embodiments of the invention, each switching element 46 of each module 44 may be replaced by a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated semiconductor device. It is also envisaged that, in other embodiments of the invention, each diode may be replaced by a plurality of series-connected diodes.

The capacitor 48 of each module 44 is selectively bypassed or inserted into the corresponding chain-link converter by changing the states of the switching elements 46. This selectively directs current through the capacitor 48 or causes current to bypass the capacitor 48, so that the module 44 provides a zero or non-zero voltage. The capacitor 48 of the module 44 is bypassed when the switching elements 46 in the module 44 are configured to form a short circuit in the module 44, whereby the short circuit bypasses the capacitor 48. This causes current in the corresponding chain-link converter to pass through the short circuit and bypass the capacitor 48, and so the module 44 provides a zero voltage, i.e. the module 44 is configured in a bypassed mode. The capacitor 48 of the module 44 is inserted into the corresponding chain-link converter when the switching elements 46 in the module 44 are configured to allow the current in the corresponding chain-link converter to flow into and out of the capacitor 48. The capacitor 48 then charges or discharges its stored energy so as to provide a non-zero voltage, i.e. the module 44 is configured in a non-bypassed mode. In this manner the switching elements 46 in each module 44 are switchable to control flow of current through the corresponding capacitor 48.

It is possible to build up a combined voltage across each chain-link converter, which is higher than the voltage available from each of its individual modules 44, via the insertion of the capacitors of multiple modules 44, each providing its own voltage, into each chain-link converter. In this manner switching of the switching elements 46 in each module 44 causes each chain-link converter to provide a stepped variable voltage source, which permits the generation of a voltage waveform across each chain-link converter using a step-wise approximation. Hence, the switching elements 46 in each limb portion 30,32 are switchable to selectively permit and inhibit flow of current through the corresponding capacitor 48 in order to control a voltage across the corresponding limb portion 30,32.

It is envisaged that, in other embodiments of the invention, each module 44 may be replaced by another type of module which includes at least one switching element and at least one energy storage device, the or each switching element and the or each energy storage device in each such module arranged to be combinable to selectively provide a voltage source.

It is also envisaged that, in other embodiments of the invention, the capacitor 48 in each module 44 may be replaced by another type of energy storage device which is capable of storing and releasing energy to provide a voltage, e.g. a battery or a fuel cell.

The voltage source converter 20 further includes a controller 50 programmed to control the switching of the switching elements 46. For the purposes of simplicity, the controller 50 is exemplarily described with reference to its implementation as a single control unit. In other embodiments, the controller 50 may be implemented as a plurality of control units. The configuration of the controller 50 may vary depending on specific requirements of the voltage source converter 20. For example, the controller 50 may include a plurality of control units, each of which is configured to control the switching of the switching elements 46 of a respective one of the modules 44. Each control unit may be configured to be internal to, or external of, the corresponding module 44. Alternatively, the controller may include a combination of one or more control units internal to the corresponding module 44 and one or more control units external of the corresponding module 44. Each control unit may be configured to communicate with at least one other control unit via telecommunications links.

Operation of the voltage source converter 20 is described as follows with reference to FIGS. 4 to 12.

In order to transfer power between the DC and AC networks 36,38,40, the controller 54 controls the switching of the switching elements 46 of the modules 44 to switch the capacitors 48 of the respective limb portions 30,32 into and out of circuit between the respective DC and AC terminals 24,26,34 to interconnect the DC and AC networks 36,38,40. The controller 54 switches the switching elements 46 of the modules 44 of each limb portion 30,32 to provide a stepped variable voltage source between the respective DC and AC terminals 24,26,34 and thereby generate a voltage waveform so as to control the configuration of an AC voltage waveform at the corresponding AC terminal 34 to facilitate the transfer of power between the DC and AC networks 36,38,40.

The controller 50 employs a switching algorithm strategy to select the most appropriate modules 44 based on their voltage levels to contribute their voltages so that each switching valve presents a respective switching valve voltage that corresponds to a control voltage reference at any point in time. The switching valve voltage of each switching valve may be controlled at discrete time intervals spaced every Tcs seconds. Preferably the voltage contributing modules 44 are selected to enable balancing of their voltage levels of the modules 44.

While the voltage source converter 20 is in operation, it may carry out a harmonic damping operation to damp harmonic content that may be present in the voltage source converter 20 or in equipment associated with the voltage source converter 20. The harmonic damping operation is described with reference to the switching valves in one of the converter limbs 28 of the voltage source converter 20. A circuit representation of the converter limb is shown in FIG. 4. It will be appreciated that the harmonic damping operation applies mutatis mutandis to the switching valves in the other converter limbs 28.

An energy budget in the form of a reserved energy $E_b$ stored in each switching valve is designated for use by the switching valve to perform a harmonic damping operation. The remaining energy stored in each switching valve is designated for use by the switching valve to carry out other functions of the voltage source converter 20. The reserved energy $E_b$ may be represented by an increased stored voltage per capacitor 48 in each module 44, by an increased number of modules 44 per switching valve or by a combination of both. The amount of reserved energy $E_b$ may vary as a function of the voltage source converter's operation.

Figure 5:
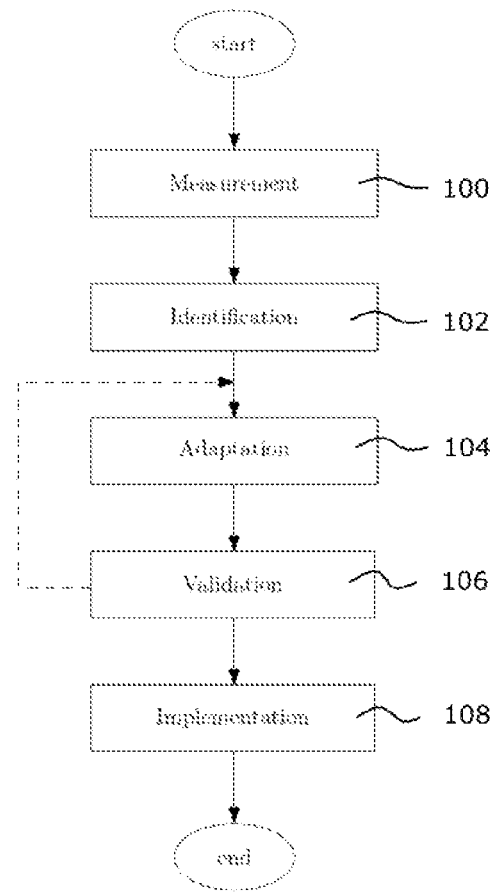
FIGS. 5 and 6 illustrate a harmonic damping operation of the voltage source converter of FIG. 1.
Figure 6:
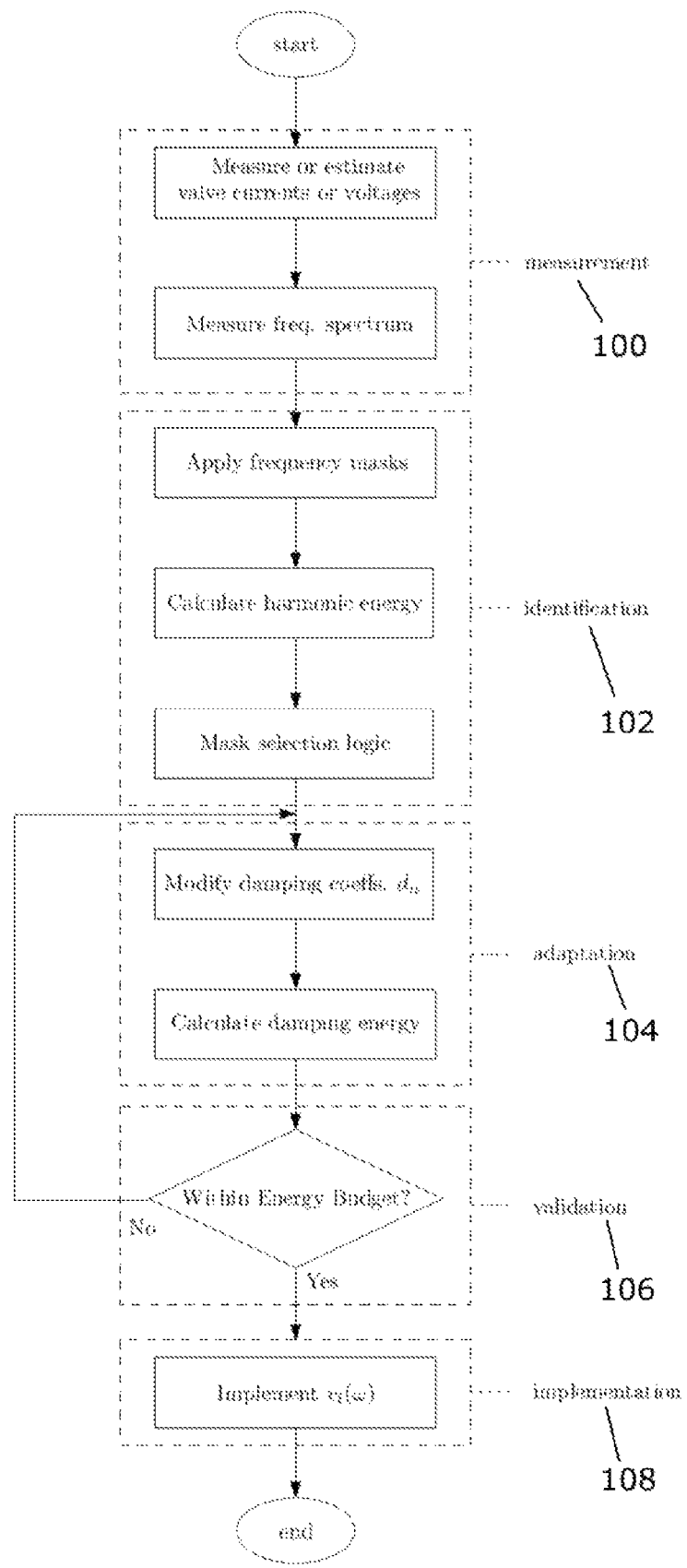

Measurement, identification, adaptation, validation and implementation steps 100,102,104,106,108 are carried out in order to enable performance of the harmonic damping operation by a given switching valve. FIG. 5 illustrates a general sequence of the measurement, identification, adaptation, validation and implementation steps 100,102,104, 106,108. FIG. 6 illustrates the sequence of the measurement, identification, adaptation, validation and implementation steps 100,102,104,106,108 in more detail.

To illustrate the working of the invention, the harmonic damping operation is described with reference to the harmonic content present in a valve reactor $L_1,L_2$ in the converter limb 28. It will be appreciated that the harmonic damping operation is applicable mutatis mutandis to harmonic content present elsewhere in the voltage source converter 20 or in equipment associated with the voltage source converter 20.

The step 100 of measuring the harmonic content present in the valve reactor $L_1,L_2$ may be carried out in a variety of ways. Current and/or voltage measurements can be taken from one or more locations in the voltage source converter 20 or in equipment associated with the voltage source converter 20, such as the primary side or the secondary side of the transformer arrangement 42.

As an example, the harmonic content present in the valve reactor $L_1$ may be measured by measuring the valve current ii of the valve reactor $L_1$ using one or more current sensors in the corresponding limb portion 30 and using an algorithm (such as Goertzel's algorithm) to establish the harmonic components of the harmonic content. Goertzel's algorithm enables efficient computation of a discrete number of harmonic components in a real-time digital signal processor.

The measurement of the harmonic components of the harmonic content in the valve reactor $L_1$ provides a harmonic frequency spectrum that is then provided to the controller 50.

In the identification step 102, the controller 50 calculates the harmonic energy from the harmonic frequency spectrum. The harmonic energy may be represented in a variety of ways, a non-limiting example of which is described as follows.

Thermal cycling of a valve reactor $L_1$ is determined by the energy that is conducted by its windings. The harmonic voltage $v_L$ induced by a harmonic current of the valve reactor $L_1$ creates heat that deteriorates the valve reactor $L_1$ and reduces its lifetime.

The generated heat is measured by the square of the root mean square of the harmonic voltage. Complex Fourier coefficients $c_n$ may be used to represent the harmonic energy of the valve reactor $L_1$.

In a non-limiting example, Parseval's identity may be used to calculate the total energy of a waveform by summing the squares of the magnitudes of the complex Fourier coefficients $c_n$. In the interest of notational simplicity and without loss of generality, the total harmonic energy is described by the sum of N consecutive Fourier components:

$$E = \sum_{\substack{n=1 \\ n \neq k}}^{N} |c_n|^2$$

where k is such that $\omega_0 = k\omega_b$, $\omega_0$ is the fundamental electrical system frequency and $\omega_b$ is the harmonic base frequency. Preferably the harmonic base frequency is not equal to the fundamental electrical system frequency in order to allow the representation of subsynchronous harmonics using a Fourier series expansion.

Figure 8:
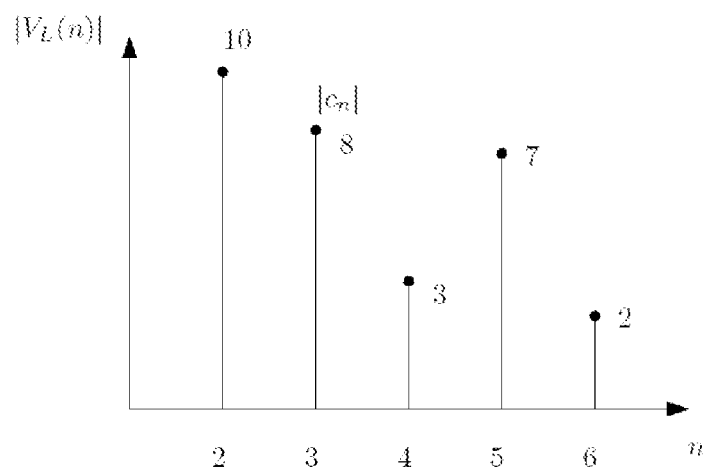
FIG. 8 shows an example of a calculated harmonic energy of a harmonic content in a valve reactor of the voltage source converter of FIG. 1.

FIG. 8 shows an example representation of a harmonic energy calculated from a harmonic content in a valve reactor $L_1$, where the complex Fourier coefficients $c_n$ of the harmonic energy have values of 10, 8, 3, 7 and 2 corresponding to the second, third, fourth, fifth and sixth harmonic orders respectively and where the total energy of the harmonic energy, measured in corresponding units (c.u.), is:

$$E = \sum_{n=2}^{6} |c_n|^2 = 226 \text{ c.u.}$$

The harmonic energy may be calculated from harmonic components over consecutive harmonic orders, non-consecutive harmonic orders or a combination of consecutive and non-consecutive harmonic orders.

The controller 50 may apply one or more frequency masks to mask one or more harmonics of the obtained harmonic frequency spectrum before calculating the harmonic energy from the or each unmasked harmonic of the harmonic frequency spectrum. The frequency masking step may be required to meet application requirements, e.g. customer specifications, that specify which harmonic content can/must be damped/eliminated and which harmonic content can/must be left unmodified. The or each frequency mask may be defined either offline or in real-time. It will be understood that the frequency masking step is optional.

The or each frequency mask may be pre-defined for a set of one or more frequency components. In one example, a mask, m=[$m_1, m_2 \ldots m_9$]=[0 1 0 1 0 1 0 0 0], will mask the first, third, fifth, seventh, eighth and ninth harmonic components of a harmonic frequency spectrum containing nine harmonic components, which then lets the controller 50 calculate the harmonic energy from the second, fourth and sixth harmonic components of the harmonic frequency spectrum. In another example, the mask may be configured to consist of all ones so that m=[$m_1, m_2 \ldots m_9$]=[1 1 1 1 1 1 1 1 1].

The controller 50 may be programmed to select from a plurality of frequency masks so that the selected frequency mask(s), when applied, result in a target amount of harmonic energy content associated with the unmasked harmonic(s). Furthermore, the controller 50 may be programmed to select from a plurality of frequency masks so that the selected frequency mask(s), when applied, result in the highest amount of harmonic energy content associated with the unmasked harmonic(s). Such selection logic may be used to prioritise damping of the harmonic component(s) that contain most of the harmonic energy of the harmonic frequency spectrum.

The controller 50 may be programmed to include a hysteresis function that, with reference to a harmonic energy hysteresis band, determines whether modification of damping coefficients $d_n$ of a harmonic damping transfer function of the given switching valve is required. The purpose of the harmonic energy hysteresis band is to avoid unnecessary modification of damping coefficients do when the measured harmonic energy is within acceptable limits. For example, the hysteresis function and the harmonic energy hysteresis band may be configured to permit modification of the damping coefficients $d_n$ of the harmonic damping transfer function of the given switching valve in the event of the obtained harmonic energy exceeding a pre-defined harmonic energy threshold or differing from a previously obtained harmonic energy by at least a pre-defined harmonic energy difference. This may be used to avoid frequent or unwanted modification of the damping coefficients $d_n$ due to, for example, measurement errors or noise.

Figure 7:
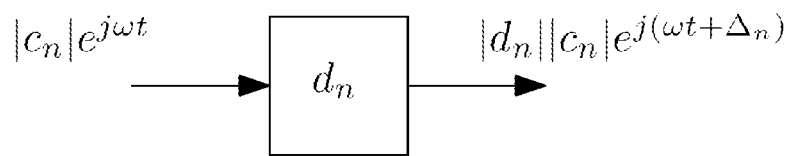
FIG. 7 shows a harmonic damping transfer function of the voltage source converter of FIG. 1.

Harmonic damping is carried out by configuring, e.g. modifying, one or more of damping coefficients $d_n$ of a harmonic damping transfer function of a given switching valve at one or more harmonic orders responsive to the obtained harmonic energy. Specifically, for a given switching valve, a damping coefficient $d_n$ at the nth harmonic order is configured so that, for a harmonic input equal to $|c_n|\exp(j\omega_b nt)$, the output at that harmonic order frequency is $|d_n||c_n|\exp(j(\omega_b nt+\Delta n))$. $d_n$ in polar form is defined as $d_n=|d_n|\exp(j\Delta n)$. The harmonic damping transfer function is illustrated in FIG. 7. The harmonic damping operation by the switching valve is carried out so that the harmonic content of the valve reactor is sufficiently damped, i.e. attenuated, below a maximum acceptable level corresponding to a maximum damping coefficient $d_{max}$. The damping coefficient do may have a magnitude that fulfils the condition $|d_n| \leq 1$.

The resultant damping energy $E_{damping}$ required for the harmonic damping operation by the switching valve is determined by:

$$E_{damping} = \sum_n \left(|c_n|^2 (1 - |d_n|^2)\right)$$

Referring to FIG. 8, on the assumption that the reserved stored energy $E_b$ of a switching valve designated for harmonic damping is 175 c.u., it is not possible for the controller 50 to operate the switching valve to carry out the harmonic damping operation to completely eliminate the harmonic content in the valve reactor $L_1$. This is because such a harmonic damping operation would require a damping energy of 226 c.u., which exceeds the reserved energy $E_b$ of 175 c.u. stored in the switching valve.

Figure 9:
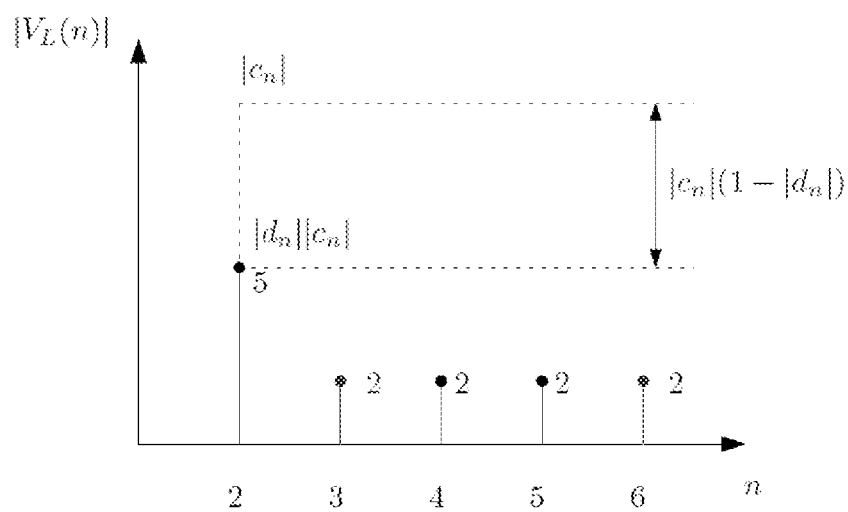
FIGS. 9 and 10 show results of adaptation steps to configure damping coefficients of a harmonic damping transfer function of the voltage source converter of FIG. 1.

A first adaptation step 104 by the controller 50 to configure the damping coefficients $d_n$ of the harmonic damping transfer function is illustrated in FIG. 9. As a result of the damping coefficient configuration in the first adaptation step 104, the complex Fourier coefficients $c_n$ of the harmonic energy of the damped harmonic content would have values of 5, 2, 2, 2 and 2 corresponding to the second, third, fourth, fifth and sixth harmonic orders respectively. This corresponds to a resultant damping energy of 185 c.u. that would be required for the harmonic damping operation.

In order to ensure that the resultant damping energy $E_{damping}$ required for the harmonic damping operation does not exceed the reserved stored energy $E_b$ of a switching valve designated for harmonic damping, a validation step 106 is carried out using the following validation condition:

$$\left(\sum_{n=2}^{N+1} |c_n|^2 (1 - |d_n|^2)\right) \leq E_b$$

where the damping coefficients do are those obtained in the adaptation step 104. This validation condition is a non-limiting example of how the validation step 104 can be performed. For instance, the summation limits (n=2 to N+1) may change depending on the application. The damping coefficients do are validated by the controller 50 if the above validation condition is met. On the other hand, if the damping coefficients $d_n$ do not satisfy the above validation condition, then an iterative process is initiated between the adaptation and validation steps 104,106 until a satisfactory solution is found.

Referring to FIG. 9, since the resultant damping energy of 185 c.u. required for the harmonic damping operation exceeds the reserved stored energy of 175 c.u., the controller 50 indicates that the configured damping coefficients do are not validated and carries out an iterative configuration of the damping coefficients $d_n$ of the harmonic damping transfer function until the above validation condition is satisfied.

Figure 10:
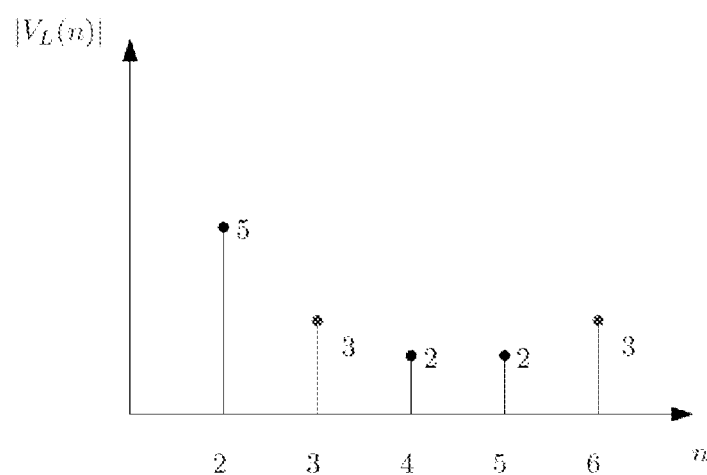

A second adaptation step 104 by the controller 50 to configure the damping coefficients do of the harmonic damping transfer function is illustrated in FIG. 10. As a result of the damping coefficient configuration in the second adaptation step 104, the complex Fourier coefficients $c_n$ of the harmonic energy of the damped harmonic content would have values of 5, 3, 2, 2 and 3 corresponding to the second, third, fourth, fifth and sixth harmonic orders respectively. This means that the resultant damping energy required for the harmonic damping operation is 175 c.u., which matches the reserved energy $E_b$ stored in the switching valve designated for harmonic damping. Since the above validation conditions are now met, the configured damping coefficients do are validated by the controller 50.

It will be appreciated that the configured damping coefficients do may be validated by the controller 50 after a single adaptation step 104 or any number of multiple adaptation steps 104. It will also be appreciated that the configured damping coefficients do are validated if the resultant damping energy required for the harmonic damping operation is lower than the reserved energy $E_b$ stored in the switching valve designated for harmonic damping.

In the or each adaptation step 104, the damping coefficient configuration may be carried out with reference to a plurality of pre-defined combinations of damping coefficients $d_n$ of the harmonic damping transfer function. For example, the plurality of pre-defined combinations of damping coefficients do of the harmonic damping transfer function may be stored in a lookup table in order to facilitate the real-time resolution of the inequality-constrained system of equations. Alternatively, the or each adaptation step 104 may be carried out with reference to a plurality of damping coefficients do obtained by using a real-time solver to solve:

$$\text{Find } 0 < d_n < d_{max} \text{ subject to} \left( \sum_{n=2}^{N+1} |c_n|^2 (1 - |d_n|^2) \right) \leq E_b$$

The real-time solver may be built into the controller. Alternatively the real-time solver may be external to the controller, where the external real-time solver is configured to receive information (e.g. the obtained harmonic energy) from the controller and send the calculated damping coefficients to the controller.

After the configured damping coefficients do are validated, the controller 50 in an implementation step 108 controls the switching of the switching elements 46 to configure a magnitude and/or a phase of the switching valve voltage so that the switching valve is operated to perform the harmonic damping operation in accordance with the validated configured damping coefficients do to control the valve reactor's current and thereby attenuate at least one harmonic component of the harmonic content of the valve reactor $L_1$.

Due to the correspondence between frequency and time domains in linear systems, configuration of the switching valve voltage by each switching valve may be carried out in either the frequency domain or the time domain. For example, to carry out the harmonic damping operation, the switching valve voltage is configured in the frequency domain, i.e. $v_i(\omega)$, in magnitude and phase at each harmonic order corresponding to the validated configured damping coefficients $d_n$. This is so that the switching valve synthesises a switching valve voltage $|v_i(n)| \angle \theta_i(n)$ at each harmonic order n. This operation may involve configuring a magnitude and a phase of the switching valve voltage in closed-loop fashion until the desired damping coefficients do are attained for the frequency range of interest.

The configuration of the controller 50 provides the voltage source converter 20 with an adaptive active damping capability for reducing harmonic stress of equipment in or associated with the voltage source converter 20 while the voltage source converter 20 is in operation. This may include active damping of at least one sub-synchronous harmonic component and/or at least one super-synchronous harmonic component.

Figure 12:
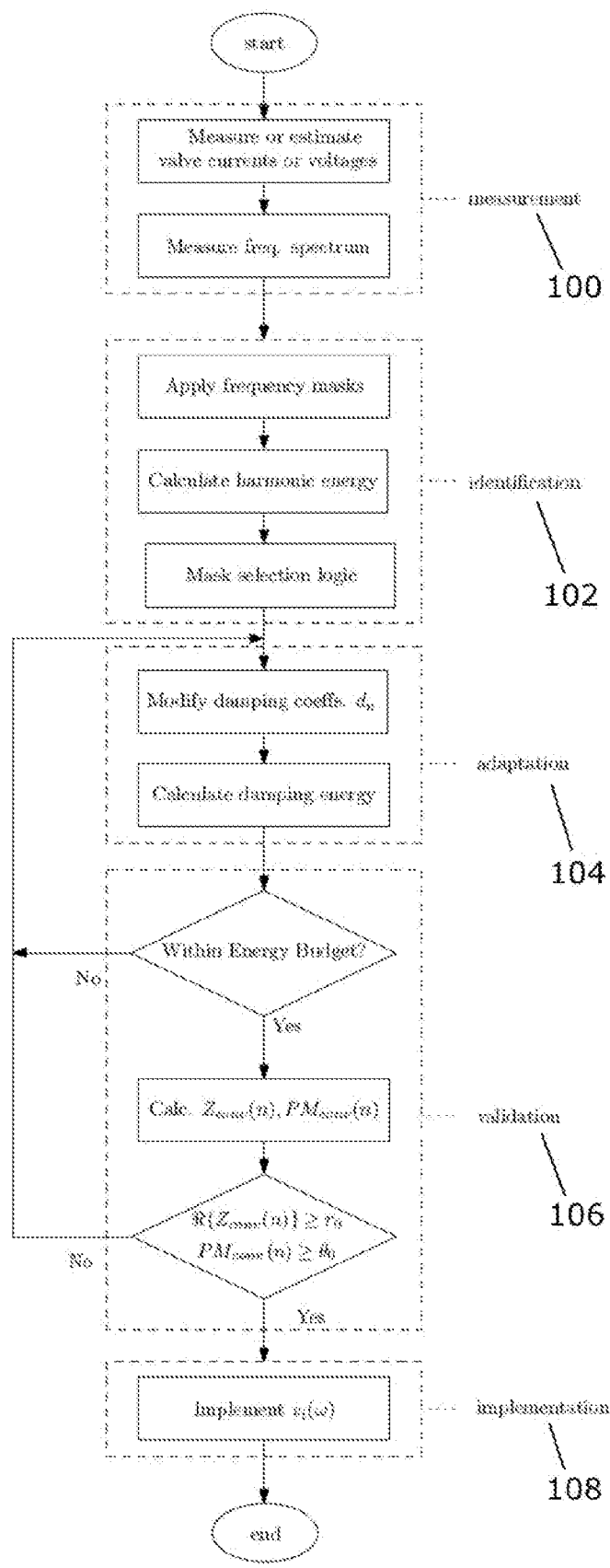

FIG. 12 illustrates an alternative sequence of the measurement, identification, adaptation, validation and implementation steps 100,102,104,106,108. The sequence of FIG. 12 is similar to the sequence of FIG. 6 but further includes additional validation requirements. In one example, the controller 50 may be programmed to validate the configured coefficients $d_n$ if an additional condition of a harmonic impedance of the voltage source converter 20 having a positive resistive component is fulfilled. The resistive component $R_{conv}$ of the voltage source converter's harmonic impedance $Z_{conv}(n)$ is determined by the real part of $Z_{conv}(n)$. Therefore, a further validation may be carried by the controller 50 by calculating the harmonic impedance $Z_{conv}(n)$ and checking whether the harmonic impedance $Z_{conv}(n)$ has a positive resistive component, i.e.:

$$R_{conv} = R\{Z_{conv}(n)\} > 0.$$

Figure 11:
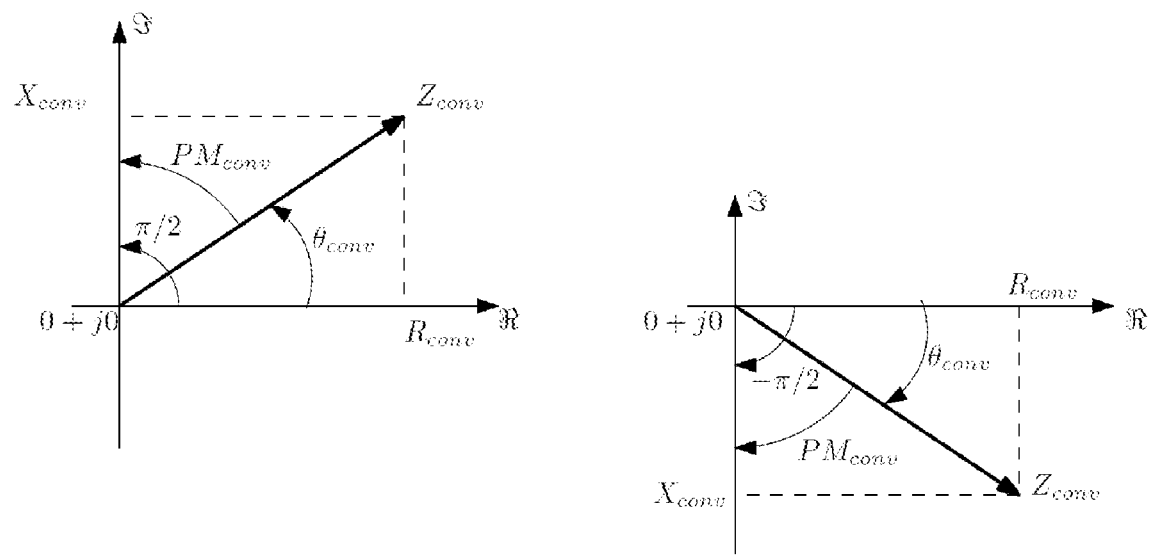
FIGS. 11 and 12 illustrate an alternative harmonic damping operation of the voltage source converter of FIG. 1.

In general, the resistive component $R_{conv}$ of the voltage source converter's harmonic impedance $Z_{conv}(n)$ could be controlled to be equal to or larger than a predefined target value $r_0$. Furthermore, the controller 50 may be programmed to evaluate a phase margin of the harmonic impedance of the voltage source converter 20 to assess whether the additional condition of a harmonic impedance of the voltage source converter having a positive resistive component is fulfilled. The phase margin $PM_{conv}$ of the voltage source converter 20 may be defined as the excess degrees that separate the voltage source converter's harmonic impedance, at a given harmonic order n, from having a negative resistive component. In other words, the phase margin $PM_{conv}$ of the voltage source converter 20 is defined as the excess degrees that separate the voltage source converter's harmonic impedance from the second and third quadrants in the complex plane. This can be translated as the excess angle for the voltage source converter's harmonic impedance angle $\theta_{conv}$ required to reach either 90 degrees (or $\pi/2$ radians) or $-90$ degrees (or $-\pi/2$ radians), whichever is closer to θconv, as illustrated in FIG. 11. Therefore, a further validation may be carried by the controller 50 by calculating the phase margin $PM_{conv}$ and checking whether the phase margin $PM_{conv}$ is equal to or larger than a predefined target value $\theta_0$.

In embodiments of the invention, the controller 50 may be programmed to control the switching of the switching elements 46 to select one or more of the modules 44 to contribute a or a respective voltage to the switching valve voltage in order to modify an average or median capacitor voltage of the switching valve as a function of the total harmonic energy calculated from Parseval's identity. This enables regulation of the reserved energy $E_b$ stored in each switching valve to meet the energy requirements of the harmonic damping operation.

We claim:

1. A switching valve for a voltage source converter, the switching valve comprising a plurality of modules, each module including at least one switching element and at least one energy storage device, the or each switching element and the or each energy storage device in each module arranged to be combinable to selectively provide a voltage source, the switching valve including a controller programmed to selectively control the switching of the switching elements to select one or more of the modules to contribute a or a respective voltage to a switching valve voltage, wherein the controller is programmed to:
  designate a reserved energy stored in the switching valve for use by the switching valve to perform a harmonic modification operation;
  obtain a harmonic frequency spectrum of a harmonic content of or associated with the voltage source converter;
  obtain a harmonic energy from the harmonic frequency spectrum;
  configure one or more of coefficients of a harmonic modification transfer function of the switching valve at one or more harmonic orders responsive to the obtained harmonic energy;
  validate the or each configured coefficient if a condition of a resultant energy required for the harmonic modification operation being equal to or lower than the reserved energy stored in the switching valve is fulfilled;
  control the switching of the switching elements to configure a magnitude and/or a phase of the switching valve voltage so that the switching valve is operated to perform the harmonic modification operation in accordance with the or each validated configured coefficient to modify at least one harmonic component of the harmonic content of or associated with the voltage source converter.

2. A switching valve according to claim 1, wherein the controller is programmed to:
  designate a reserved energy stored in the switching valve for use by the switching valve to perform a harmonic damping operation;
  obtain a harmonic frequency spectrum of a harmonic content of or associated with the voltage source converter;
  obtain a harmonic energy from the harmonic frequency spectrum;
  configure one or more of damping coefficients of a harmonic damping transfer function of the switching valve at one or more harmonic orders responsive to the obtained harmonic energy;
  validate the or each configured damping coefficient if a condition of a resultant damping energy required for the harmonic damping operation being equal to or lower than the reserved energy stored in the switching valve is fulfilled;
  control the switching of the switching elements to configure a magnitude and/or a phase of the switching valve voltage so that the switching valve is operated to perform the harmonic damping operation in accordance with the or each validated configured damping coefficient to attenuate at least one harmonic component of the harmonic content of or associated with the voltage source converter.

3. A switching valve according to claim 1, wherein the controller is programmed to:
  designate a reserved energy stored in the switching valve for use by the switching valve to perform a harmonic amplification operation;
  obtain a harmonic frequency spectrum of a harmonic content of or associated with the voltage source converter;
  obtain a harmonic energy from the harmonic frequency spectrum;
  configure one or more of amplification coefficients of a harmonic amplification transfer function of the switching valve at one or more harmonic orders responsive to the obtained harmonic energy;
  validate the or each configured amplification coefficient if a condition of a resultant amplification energy required for the harmonic amplification operation being equal to or lower than the reserved energy stored in the switching valve is fulfilled;
  control the switching of the switching elements to configure a magnitude and/or a phase of the switching valve voltage so that the switching valve is operated to perform the harmonic amplification operation in accordance with the or each validated configured amplification coefficient to amplify at least one harmonic component of the harmonic content of or associated with the voltage source converter.

4. A switching valve according to claim 1, wherein the controller is programmed to iteratively configure one or more of coefficients of a harmonic modification transfer function of the switching valve at one or more harmonic orders responsive to the obtained harmonic energy until the or each configured coefficient is validated.

5. A switching valve according to claim 1, wherein the controller is programmed to configure one or more of coefficients of a harmonic modification transfer function of the switching valve at one or more harmonic orders responsive to the obtained harmonic energy with reference to a lookup table, wherein the lookup table is configured to store a plurality of combinations of coefficients of the harmonic modification transfer function.

6. A switching valve according to claim 1, including a real-time solver that is programmed to calculate coefficients of a harmonic modification transfer function of the switching valve responsive to the obtained harmonic energy so as to enable the controller to then configure one or more of coefficients of the harmonic modification transfer function of the switching valve at one or more harmonic orders.

7. A switching valve according to claim 1, wherein the controller is programmed to validate the or each configured coefficient if an additional condition of a harmonic impedance of the voltage source converter having a positive resistive component is fulfilled.

8. A switching valve according to claim 7, wherein the controller is programmed to evaluate a phase margin of the harmonic impedance of the voltage source converter to assess whether the additional condition of a harmonic impedance of the voltage source converter having a positive resistive component is fulfilled.

9. A switching valve according to claim 1, wherein the controller includes a frequency mask configured to mask one or more harmonics of the obtained harmonic frequency spectrum, and wherein the controller is programmed to obtain the harmonic energy from the or each unmasked harmonic of the harmonic frequency spectrum.

10. A switching valve according to claim 1, wherein the controller is programmed to selectively control the switching of the switching elements to select one or more of the modules to contribute a or a respective voltage to the switching valve voltage in order to modify an average or median energy storage device voltage of the switching valve as a function of the obtained harmonic energy.

11. A voltage source converter comprising a switching valve according to claim 1.

12. A method of operating a switching valve for a voltage source converter, the switching valve comprising a plurality of modules, each module including at least one switching element and at least one energy storage device, the or each switching element and the or each energy storage device in each module arranged to be combinable to selectively provide a voltage source, the switching elements being switchable to select one or more of the modules to contribute a or a respective voltage to a switching valve voltage, wherein the method comprises the steps of:

designating a reserved energy stored in the switching valve for use by the switching valve to perform a harmonic modification operation;

obtaining a harmonic frequency spectrum of a harmonic content of or associated with the voltage source converter;

obtaining a harmonic energy from the harmonic frequency spectrum;

configuring one or more of coefficients of a harmonic modification transfer function of the switching valve at one or more harmonic orders responsive to the obtained harmonic energy;

validating the or each configured coefficient if a condition of a resultant modification energy required for the harmonic modification operation being equal to or lower than the reserved energy stored in the switching valve is fulfilled;

controlling the switching of the switching elements to configure a magnitude and/or a phase of the switching valve voltage so that the switching valve is operated to perform the harmonic modification operation in accordance with the or each validated configured coefficient to modify at least one harmonic component of the harmonic content of or associated with the voltage source converter.

13. A method according to claim 12, including the steps of:

designating a reserved energy stored in the switching valve for use by the switching valve to perform a harmonic damping operation;

obtaining a harmonic frequency spectrum of a harmonic content of or associated with the voltage source converter;

obtaining a harmonic energy from the harmonic frequency spectrum;

configuring one or more of damping coefficients of a harmonic damping transfer function of the switching valve at one or more harmonic orders responsive to the obtained harmonic energy;

validating the or each configured damping coefficient if a condition of a resultant damping energy required for the harmonic damping operation being equal to or lower than the reserved energy stored in the switching valve is fulfilled;

controlling the switching of the switching elements to configure a magnitude and/or a phase of the switching valve voltage so that the switching valve is operated to perform the harmonic damping operation in accordance with the or each validated configured damping coefficient to attenuate at least one harmonic component of the harmonic content of or associated with the voltage source converter.

14. A method according to claim 12, including the steps of:

designating a reserved energy stored in the switching valve for use by the switching valve to perform a harmonic amplification operation;

obtaining a harmonic frequency spectrum of a harmonic content of or associated with the voltage source converter;

obtaining a harmonic energy from the harmonic frequency spectrum;

configuring one or more of amplification coefficients of a harmonic amplification transfer function of the switching valve at one or more harmonic orders responsive to the obtained harmonic energy;

validating the or each configured amplification coefficient if a condition of a resultant amplification energy required for the harmonic amplification operation being equal to or lower than the reserved energy stored in the switching valve is fulfilled;

controlling the switching of the switching elements to configure a magnitude and/or a phase of the switching valve voltage so that the switching valve is operated to perform the harmonic amplification operation in accordance with the or each validated configured amplification coefficient to amplify at least one harmonic component of the harmonic content of or associated with the voltage source converter.

15. A method of operating a voltage source converter comprising a switching valve, the switching valve comprising a plurality of modules, each module including at least one switching element and at least one energy storage device, the or each switching element and the or each energy storage device in each module arranged to be combinable to selectively provide a voltage source, the switching elements being switchable to select one or more of the modules to contribute a or a respective voltage to a switching valve voltage, the method comprising the step of operating a switching valve in accordance with claim 12.

* * * * *